Aug. 5, 1969    D. Z. GLUCKSMAN ET AL    3,459,365
TRANSVERSE FLOW BLOWER UNIT HAVING CAVITY WITH
RESTRICTED OPENING ADJACENT CUT-OFF SECTION
Filed Dec. 1, 1967
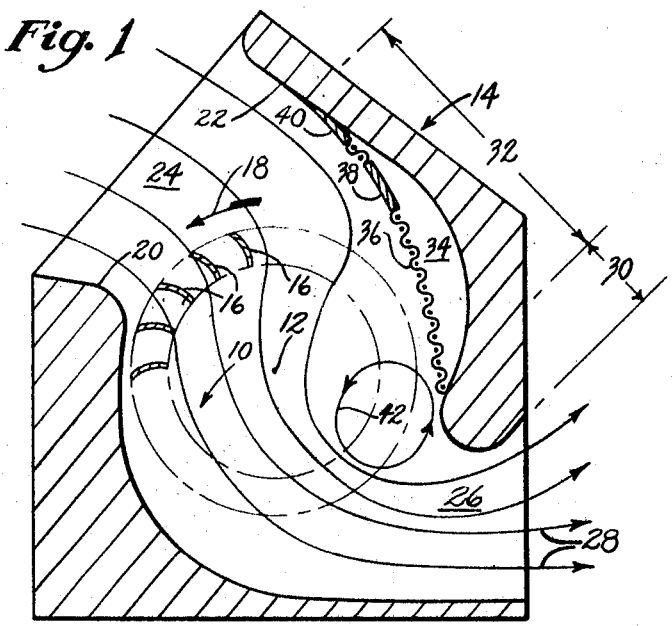
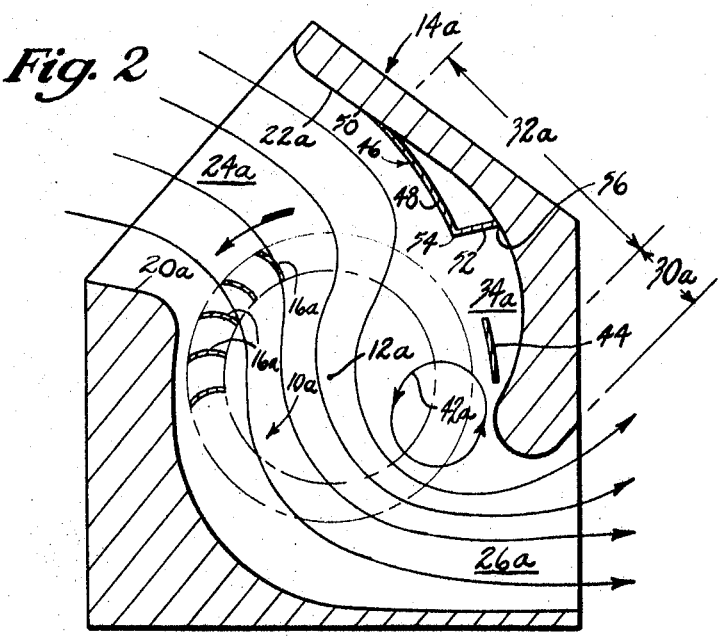
INVENTORS
DOV ZEEV GLUCKSMAN
RICHARD W. BORNSTEIN
BY
McCormick, Paulding & Huber
ATTORNEYS United States Patent Office 3,459,365
Patented Aug. 5, 1969

3,459,365
TRANSVERSE FLOW BLOWER UNIT HAVING CAVITY WITH RESTRICTED OPENING ADJACENT CUT-OFF SECTION
Dov Zeev Glucksman, West Newton, Mass., and Richard W. Bornstein, Torrington, Conn., assignors to The Torrington Manufacturing Company, Torrington, Conn., a corporation of Connecticut
Filed Dec. 1, 1967, Ser. No. 687,303
Int. Cl. F04d *17/08, 29/40;* F04b *39/00*
U.S. Cl. 230—125                                      4 Claims

ABSTRACT OF THE DISCLOSURE

A transverse flow blower unit comprising a rotor and a housing with a cavity located adjacent and on the inlet chamber side of a housing cut-off section in turn disposed between inlet and discharge chambers, and one or more axially elongated members disposed adjacent the cut-off section on the inlet chamber side thereof to restrict the cavity opening for sound attenuation and to effect vortex stabilization.

Background of the invention

Transverse flow blower units have been provided in the past with various cavities in the housings and with other housing characteristics and features directed to improvement of performance and noise characteristics. For example, cavities or chambers have been provided adjacent cut-off sections of housings between inlet and discharge or low and high pressure chambers and cavities or chambers as well as other auxiliary housing features have been provided on diametrically opposite sides of the blower rotors.

Summary of the invention

It is an object of the present invention to provide a housing cavity adjacent a cut-off section in a transverse flow blower unit wherein specific design characteristics of the cavity and its opening to the rotor are provided to effect sound attenuation and at the same time to encourage stabilization of the fluid vortex whereby to enhance blower performance.

In fulfillment of this object a cavity is provided adjacent the cut-off section in a transverse flow blower unit housing and at least one axially elongated member is disposed adjacent the cut-off section to restrict the cavity opening for sound attenuation. Said member serves additionally to encourage vortex stabilization and thereby to enhance blower performance.

The drawing shows preferred embodiments of the invention and such embodiments will be described, but it will be understood that various changes may be made from the constructions disclosed, and that the drawing and description are not to be construed as defining or limiting the scope of the invention, the claims forming a part of this specification being relied upon for that purpose.

Brief description of the drawings

FIG. 1 is a schematic illustration of a transverse flow blower unit forming a first embodiment of the present invention.

FIG. 2 is a schematic illustration of a transverse flow blower unit forming a second embodiment of the present invention.

Description of the preferred embodiments

Referring particularly to FIG. 1 it will be seen that a transverse flow blower rotor or wheel 10 is adapted for rotation about an axis 12 within an axially elongated housing 14. The wheel 10 is also axially elongated and includes a series of circumaxially spaced fluid moving blades 16, 16 which may vary widely in form but which are conventionally constructed of formed sheet metal. The blower wheel or rotor 10 is shown adapted for rotation about the axis 12 in a counterclockwise direction as indicated by the arrow 18.

The housing 14 includes spaced first and second axially elongated walls 20, 22 which define respectively on generally opposite sides of and peripherally adjacent the rotor 10 a low pressure or inlet chamber 24 and a high pressure or discharge chamber 26, the direction of fluid flow through the housing and rotor being indicated generally by the arrows 28, 28. The first housing wall 20 extends in a smooth arcuate path from the inlet chamber 24 past the rotor 10 to the discharge chamber 26 and, in the embodiment of FIG. 1, the wall 20 follows a generally spiral path from the inlet chamber to the discharge chamber.

The second housing wall 22 also extends from the inlet chamber 24 past the rotor 10 to the discharge chamber 26 and has a cut-off section between the inlet and discharge chambers and which is spaced from the periphery of the rotor. The cut-off section is indicated generally in FIG. 1 at 30 and takes a gradually rounded convex shape viewed from the interior of the housing.

The second wall 22 also has a section indicated generally at 32 which is disposed on the inlet chamber side of the cut-off section 30 and adjacent the cut-off section and which is spaced from the rotor periphery a distance greater than the spacing between the cut-off section 30 and the rotor periphery to define a cavity 34. The wall section 32 may vary widely in form but is shown as being generally concave viewed from the interior of the housing and follows a smooth arcuate path which gradually departs from the rotor periphery in a direction away from the cut-off section 30.

The housing 14 may vary widely as to material and mode of manufacture, but is preferably constructed of formed sheet metal.

In accordance with the present invention and as mentioned above, a sound attenuation and vortex stabilization means is provided in the housing 14 and comprises at least one small axially elongated member which is disposed on the inlet chamber side of the cut-off section 30 between the rotor periphery and the second housing wall 22. More particularly, said means is disposed in spaced relationship with the rotor periphery adjacent the cavity 34 so as to provide a restricted opening for the cavity for sound attenuation. In the FIG. 1 embodiment, the said means comprises a sheet of perforate material 36 which is disposed between the rotor periphery and the second wall 22 and which has opposite end portions connected with and supported by the wall 22 respectively at the cut-off section 30 and at a portion of the wall 22 adjacent the opening to the inlet chamber 24.

The perforate material 36 is preferably arranged as shown in a plane generally normal to a rotor radius and may take the form of a fine mesh material. Thus, the sheet of material 36 may be said to include a plurality of similar small axially elongated members which form a part of the mesh. Further, and in accordance with the invention as mentioned above there is provided at least one additional axially elongated member which is substantially larger in cross section than the said small axially elongated members of the mesh. Such a member is indicated generally at 38 in the form of a thin flat strip of imperforate material which is mounted flatly on the perforate sheet 36. The member 36 may be of sheet metal construction or may take various other forms.

In the FIG. 1 embodiment, there are two axially elongated members additional to the small members of the mesh screen and a second such member is indicated at 40, disposed over the end portion of the mesh approximately at the area of attachment of the mesh to the second housing wall 22. As will be observed, the strips 38, 40 are arranged in spaced relation with each other and the strip 40 may be of sheet metal construction in a manner similar to the strip 38.

With the perforate sheet 36 and the strips 38 and 40 arranged as shown the cavity 34 is adapted for restricted opening to the periphery of the rotor 10 to the end that beneficial results of sound attenuation are achieved. Further, a beneficial effect is achieved in vortex stabilization, a fluid vortex being indicated generally by the arrows 42, 42 as maintained in a relatively fixed position along the periphery of the rotor 10.

Referring now particularly to FIG. 2, a rotor 10a therein may be taken as identical with the rotor 10 of FIG. 1 and a housing 14a may be regarded as identical with the housing 14 except for the particular construction of the sound attenuation and vortex stabilization means adjacent the cavity 34a. Further, a second housing wall 22a has a cut-off section 30a and a cavity defining section 32a identical with the corresponding sections of the wall 22 of FIG. 1.

Sound attenuation and vortex stabilization means in FIG. 2 comprises a member 44 which is of thin flat strip-like construction and which is disposed in spaced relationship with the rotor periphery and with the second housing wall 22a whereby to provide a restricted opening for the cavity 34a. As will be seen, the member 44 serves to partially define a passageway therebehind adjacent the housing wall 28a and there are unobstructed openings on each side of the member for the flow of vortex fluid through the cavity 34a. That is, a portion of the vortex fluid as indicated generally by the arrows 42a can enter the cavity 34a adjacent the cut-off section 30a and flow past and behind the member 44 for passage through the cavity 34a and reentry to the rotor 10a. The member 44 is preferably arranged in a plane generally normal to a rotor radius as shown and may be of sheet metal construction and supported at opposite end portions in the housing 14a.

Preferably, there is also provided a flow constraining or obstructing means in the inlet chamber 24a and such means is indicated generally at 46. A first surface 48 of the means or member 46 extends from the housing second wall 22a at a junction 50 along an axial line near the inlet end of the inlet chamber and gradually approaches the rotor periphery but terminates short of the rotor periphery and short of the aforesaid axial member 44. A second surface 52 of the member 46 extends from a junction with said first surface at 54 generally outwardly and away from the rotor periphery to a junction 56 with the arcuate cavity defining second section of the wall 22a. Thus, in FIG. 2, the cavity 34a is considerably less extensive along the periphery of the rotor than in the case of the cavity 34 and the perforate member 36 is eliminated altogether in the housing construction. Elimination of the perforate member 36 is believed to result in advantage in avoiding alteration of blower performance characteristics as might occur with the clogging of openings in the perforate material.

We claim:

1. A transverse flow blower unit comprising a rotor having a circumaxially spaced series of axially elongated fluid moving blades, a housing disposed about said rotor and including spaced first and second axially elongated walls defining on generally opposite sides of and peripherally adjacent the rotor a low pressure fluid inlet chamber and a high pressure fluid discharge chamber, said first housing wall extending in a smooth arcuate path from said inlet chamber past said rotor to said discharge chamber, and said second wall extending from said inlet chamber past the rotor to said discharge chamber and having a cut-off section between said inlet and discharge chambers and spaced from the periphery of said rotor, and said second wall also having a section on the inlet chamber side of said cut-off section and adjacent thereto which is spaced from the rotor periphery a distance greater than the spacing between the cut-off section and the rotor periphery to define a cavity, and means disposed on the inlet chamber side of said cut-off section between the rotor periphery and said second housing wall and comprising a sheet of perforate material disposed between said rotor periphery and said second wall in a plane generally normal to a rotor radius and having a plurality of similar small axially elongated members and at least one additional axially elongated member substantially larger in cross section than said small members, said last mentioned means serving to restrict the opening from the rotor to the cavity for sound attenuation and serving also to effect vortex stabilization.

2. A transverse flow blower unit as set forth in claim 1 wherein said perforate sheet takes the form of a fine mesh material, and wherein said additional elongated member takes the form of a thin flat axially elongated strip of imperforate material mounted flatly on said perforate sheet.

3. A transverse flow blower unit as set forth in claim 1 wherein a plurality of thin flat strips of imperforate material are mounted flatly on said perforate sheet in spaced relationship with each other.

4. A transverse flow blower unit comprising a rotor having a circumaxially spaced series of axially elongated fluid moving blades, a housing disposed about said rotor and including spaced first and second axially elongated walls defining on generally opposite sides of and peripherally adjacent the rotor a low pressure fluid inlet chamber and a high pressure fluid discharge chamber, said first housing wall extending in a smooth arcuate path from said inlet chamber past said rotor to said discharge member, and said second wall extending from said inlet chamber past the rotor to said discharge chamber and having a cut-off section between said inlet and discharge chambers and spaced from the periphery of said rotor, and said second wall also having a section to the inlet chamber side of said cut-off section and adjacent thereto which is spaced from the rotor periphery a distance greater than the spacing between the cut-off section and the rotor periphery to define a cavity, and which wall section extends from said cut-off section in a smooth arcuate path which gradually departs from the rotor periphery, and means disposed on the inlet chamber side of said cut-off section between the rotor periphery and said second housing wall and comprising at least one axially elongated thin flat strip of imperforate material arranged in a plane generally normal to a rotor radius and disposed on the inlet chamber side of said cut-off section between the rotor periphery and said second housing wall, said strip serving to partially define a passageway therebehind adjacent said second housing wall and having unobstructed openings on each side of itself for the flow of vortex fluid through said openings and passageway and around a rear portion of the strip from the cutoff side of the strip toward the inlet chamber side thereof, and a fluid flow obstructing member in said inlet chamber adjacent said cavity in said second wall with first and second angularly arranged axially extending surfaces, said first surface extending from said housing second wall along an axial line near the inlet end of the inlet chamber and gradually approaching the rotary periphery but terminating short of said axially elongated strip, and said second surface extending from a junction with said first surface generally outwardly and away from said rotor periphery to a junction with said arcuate cavity defining second wall section.

References Cited
UNITED STATES PATENTS

| | | | |
|---|---|---|---|
| 2,222,398 | 12/1940 | Hamblin | 230—232 |
| 3,280,902 | 10/1966 | Laing. | |
| 3,286,914 | 11/1966 | Baverstock. | |
| 3,312,389 | 4/1967 | Matsui | 230—233 |
| 3,325,089 | 6/1967 | Vogler. | |

FOREIGN PATENTS

| | | |
|---|---|---|
| 1,031,588 | 6/1966 | Great Britain. |

HENRY F. RADUAZO, Primary Examiner

U.S. Cl. X.R.
230—133, 232